(No Model.)
F. H. ENSIGN.
WHEELBARROW WHEEL.
No. 490,277. Patented Jan. 24, 1893.
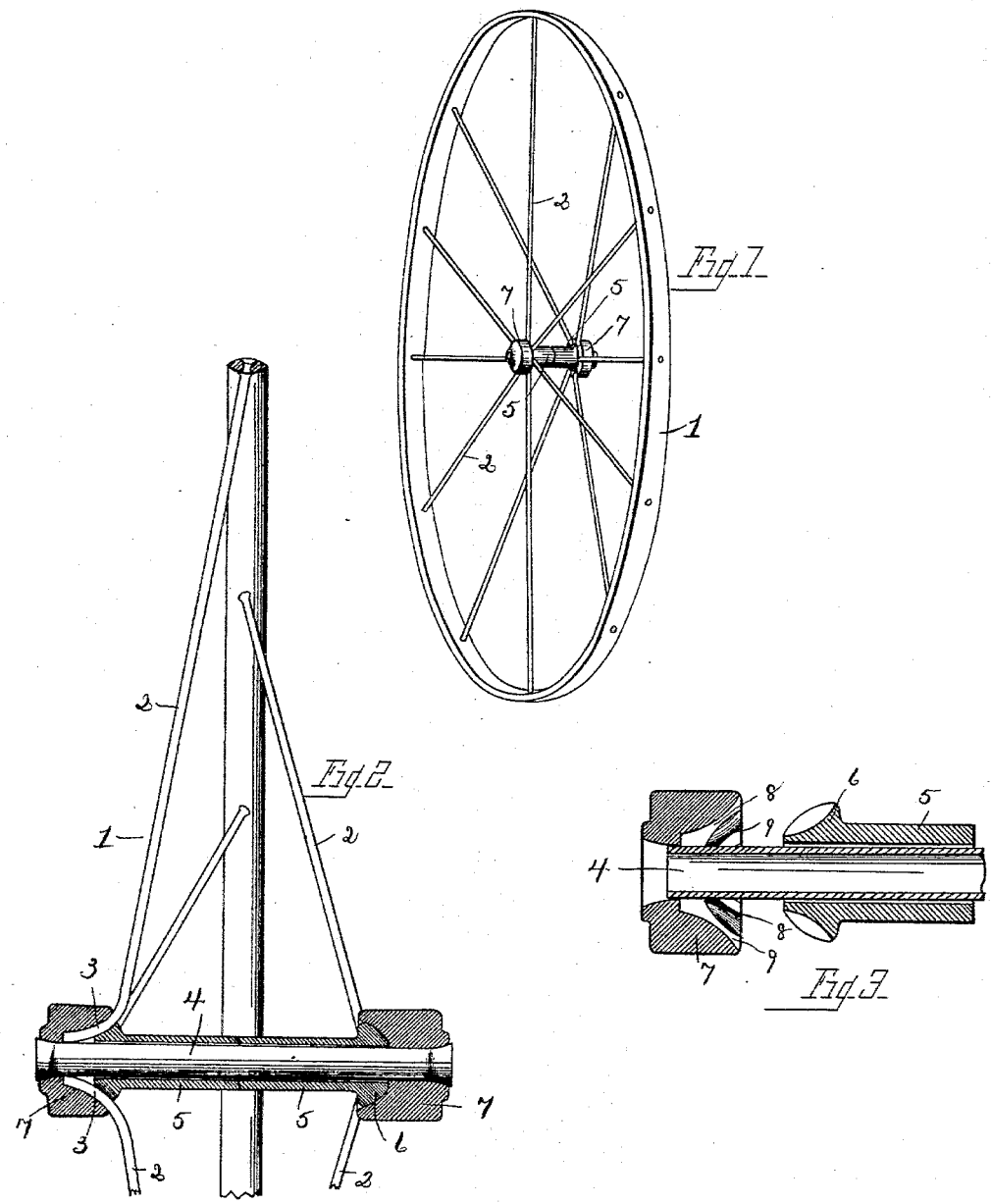
WITNESSES
Carroll J. Webster
Sherman W. Lott
INVENTOR
Frank H Ensign
By William Webster
atty

UNITED STATES PATENT OFFICE.

FRANK. H. ENSIGN, OF TOLEDO, OHIO.

WHEELBARROW-WHEEL.

SPECIFICATION forming part of Letters Patent No. 490,277, dated January 24, 1893.

Application filed September 30, 1892. Serial No. 447,370. (No model.)

*To all whom it may concern:*

Be it known that I, FRANK. H. ENSIGN, of Toledo, county of Lucas, and State of Ohio, have invented certain new and useful Improvements in a Wheelbarrow-Wheel; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to metal wheels, and has more especial relation to wheels for wheelbarrows.

The object of the invention is to construct a strong and inexpensive wheel for this purpose, with means for compensating for any width of barrow frame without affecting the pitch of the spokes.

A further object is to secure the spokes to the rim and then to the hub in a manner to put tension upon the spokes in the act of securing the same.

The invention consists in the parts and combination of parts hereinafter described and pointed out in the claims.

In the drawings: Figure 1 is a perspective view of a complete wheel. Fig. 2 is a vertical section through the center of the wheel transversely, and Fig. 3 is a detail sectional view through the center of the hub.

1 designates the wheel comprising the rim into which the spokes 2 are riveted the outer ends of the spokes being shouldered to bear upon the inner sides of the rim the inner ends of the spokes curved outwardly as at 3 where they are secured into the hub. The hub comprises a tubular thimble 4 of the full length of the width of the hub and initially of the same diameter throughout its length. Encircling the thimble or shell is a tubular casing 5 preferably composed of two like sections for convenience of molding and assembling the parts. Casing 5 comprises the tubular body, and the enlarged ends 6 of conical formation and grooved semi-circularly in cross section to receive the curve of the spokes there being caps 7 formed with a central perforation through which the thimble or shell 4 passes and a conical recess 8 upon the inner side into which the conical ends 6 of the casing fit, and a slight taper to the perforation upon the outer side of the cap to allow of expanding of the ends of the thimble or shell to hold the parts assembled. The interior of the cap in which is the conical recess 8 is formed with grooves 9 of semi-circular formation in cross section, the grooves extending from the concentric wall at the greatest diameter to a radius of a diameter to allow the ends of the spokes to closely fit therein and rest upon the thimble or shell 4.

In assembling the parts, the spokes are first cut the proper length and curved. The outer ends are secured within the rim of the wheel are then spread sufficiently to admit the casing which being of two parts is convenient of insertion the curve of the spokes are placed within the recesses in the enlargements of the casing, and the shell is passed into the casing with the ends protruding from each side when the caps are placed upon the ends of the shell and the ends of the thimble or shell are then expanded to fill the taper of the outer sides of the perforation which draws the caps closely upon the conical enlargements of the casing, and secures the spokes firmly in place and at the same time forces the spokes radially to put tension thereon. The axle of the barrow is now passed through the shell and secured in the frame.

In adapting the wheel to frames of barrows of different construction the same spread of spokes can be maintained, and any difference of length of axle is compensated for by the length of the cap and shell a variation involving practically no expense.

What I claim is:

1. In a wheel, the combination with a thimble, of the casing having the heads or enlargements tapering outwardly and grooved, the caps having recesses on their inner faces to receive the heads, the faces of the recesses being grooved also, the spokes adapted to be secured in said grooves and the rim, the ends of the thimble being expanded to secure the parts in their proper position.

2. In a wheel, the combination with a thimble, of a casing made in two sections, each section having a head at its outer end which heads taper and are grooved longitudinally, and the caps perforated to receive the thimble and recesses to receive the heads, the outer edge of the perforations being beveled to permit the expansion of the thimbles, the faces of the recesses having grooves to mate with those on the heads, and the spokes and rim constituting the wheel.

In testimony that I claim the foregoing as my own I hereby affix my signature in presence of two witnesses.

FRANK. H. ENSIGN.

Witnesses:
 WILLIAM WEBSTER,
 CARROLL J. WEBSTER.